United States Patent [19]

Sato et al.

[11] Patent Number: 5,287,226
[45] Date of Patent: Feb. 15, 1994

[54] RECORDING AND REPRODUCING SYSTEM FOR RECORDING AND REPRODUCING VIDEO SIGNALS CORRESPONDING TO AN AUDIO SIGNAL

[75] Inventors: Yoshiaki Sato; Nobuya Sakai, both of Tokyo, Japan

[73] Assignee: Asahi Kogaku Kogyo Kabushiki Kaisha, Tokyo, Japan

[21] Appl. No.: 658,161

[22] Filed: Feb. 20, 1991

[30] Foreign Application Priority Data

Feb. 20, 1990 [JP] Japan ..................... 2-39367

[51] Int. Cl.⁵ .................. H04N 5/781; G11B 5/02
[52] U.S. Cl. ..................... 360/35.1; 360/22; 360/27; 360/11.1; 358/341; 358/906
[58] Field of Search ............ 360/11.1, 19.1, 22, 360/27, 33.1, 35.1; 358/341, 906

[56] References Cited

U.S. PATENT DOCUMENTS

| | | | |
|---|---|---|---|
| 4,065,794 | 12/1977 | Shutterly | 360/19.1 |
| 4,065,795 | 12/1977 | Shutterly | 380/35.7 |
| 4,602,295 | 7/1986 | Moriyama et al. | 360/19.1 |
| 4,611,248 | 9/1986 | Honjo et al. | 360/10.1 |
| 4,800,448 | 1/1989 | Kaneko et al. | 360/35.1 |
| 4,860,122 | 8/1989 | Kanamaru | 360/35.1 |
| 4,931,878 | 6/1990 | Takei et al. | 358/906 |
| 4,959,735 | 9/1990 | Kawai | 358/906 |
| 5,130,816 | 7/1992 | Yoshio | 358/341 |

FOREIGN PATENT DOCUMENTS

| | | |
|---|---|---|
| 0180477A3 | 5/1986 | European Pat. Off. |
| 0202948A3 | 11/1986 | European Pat. Off. |
| 0223423 | 5/1987 | European Pat. Off. |
| 3607562A1 | 9/1986 | Fed. Rep. of Germany |
| 2-50358 | 2/1990 | Japan |
| WO8601619 | 3/1986 | PCT Int'l Appl. |

OTHER PUBLICATIONS

Engineering Department, Electronic Industries Association of Japan, "Specification of Still Video Floppy Disc Systems," Sep. 1987.
European Search Report EP 91 10 2435—Dec. 23, 1991.

Primary Examiner—Edward P. Westin
Assistant Examiner—Benjamin D. Driscoll
Attorney, Agent, or Firm—Sughrue, Mion, Zinn, Macpeak & Seas

[57] ABSTRACT

An audio signal of arbitrary length is recorded on a single track of a magnetic disk, and a plurality of corresponding or associated video signals are recorded on successive coaxial tracks. The deviation of each video signal is counted during the reception of the audio signal, and data representative thereof is superposed on the recorded video signals to "coordinate" subsequent playback.

10 Claims, 6 Drawing Sheets

RECORDING AND REPRODUCING SYSTEM FOR RECORDING AND REPRODUCING VIDEO SIGNALS CORRESPONDING TO AN AUDIO SIGNAL

BACKGROUND OF THE INVENTION

This invention relates to a magnetic recording and reproducing system such as an electronic still camera, in which video signals and audio signals are recorded, in combination in coaxial tracks on a magnetic disk.

An electronic still camera is designed so that video signals and audio signals are recorded on the magnetic disk. More specifically, in a normal mode, the video signals and the audio signals are recorded independently of each other; and in an AV mode, they are recorded in combination in coaxial tracks adjacent to each other on a magnetic disk. Therefore, the video signals and audio signals are reproduced separately when recorded in the normal mode, and simultaneously when recorded in the AV mode.

In the conventional electronic still camera, audio signals recorded in a plurality of tracks can be provided for a video signal recorded in one track, but video signals recorded in a plurality of tracks cannot be provided for an audio signal recorded in one track. Hence, it is difficult to achieve an operation such that, while an audio signal having an arbitrary length is being continuously reproduced, different video images are reproduced successively for different desired periods of time.

SUMMARY OF THE INVENTION

In view of the foregoing, an object of this invention is to provide a magnetic recording and reproducing device in which a plurality of video tracks provided for an audio track having an arbitrary length are recorded in combination on a magnetic disk and the recorded video signals are reproduced successively in combination with the corresponding audio signal with ease.

Further, it is an object of the present invention to provide a magnetic recording and reproducing system in which the recorded video signals are reproduced successively for desired different periods of time with ease, the different periods of time being determined in response to a video trigger signal.

The above and other objects of the present invention are attained by the provision of a magnetic recording device having an audio/video mode in which a plurality of video signals corresponding to an audio signal are recorded on coaxial tracks of a magnetic recording disk, comprising a recording means for recording the video signals and the corresponding audio signal selectively on the coaxial tracks of the magnetic recording disk and a control means for controlling said recording means so as to record the video signal together with a next video track data representing presence or absence of the following video track where the remaining video signal corresponding to the audio signal is to be recorded, said control means controlling said recording means so as to record the, audio signal together with a start video track data corresponding to a start video track where the first video signal is to be recorded.

The above and other objects of the present invention are also attained by the provision of a magnetic reproducing device having an audio/video mode in which an audio signal and a plurality of video signals corresponding to the audio signal are reproduced in combination from a magnetic disk, comprising a signal reproducing means for reproducing the signals recorded on the magnetic disk and a control means for controlling said signal reproducing means to reproduce the audio signal and each of the video signals successively according to a start video track data where the first video signal has been recorded and a next video track data representing presence or absence of the following video track where the remaining video signal corresponding to the audio signal is to be recorded.

The above and other objects of the invention are further accomplished by the provision of a magnetic recording and reproducing device having an audio/video mode in which a plurality of video signals corresponding to an audio signal are recorded on coaxial tracks of a magnetic recording disk, and the recorded audio and video signals are reproduced in combination, comprising a signal recording and reproducing means for recording the video signals and the corresponding audio signal selectively on the coaxial tracks of the magnetic recording disk and reproducing the recorded video and audio signals in combination therefrom and a control means for controlling said recording and reproducing means so as to record the video signal together with a next video track data representing presence or absence of the following video track where the remaining video signal corresponding to the audio signal is to be recorded, and said control means controlling said recording and reproducing means so as to record the audio signal together with a start video track data to a start video track where the first video signal is to be recorded, the video signals being successively reproduced from the video signal recorded on a track designated by the start video track data according to the next video track data. In reproducing the video signal, the video signals are reproduced successively for the periods of time equal to the measured actual intervals, respectively, according to the interval data stored in the above described user's area.

The present disclosure relates to the subject matter contained in Japanese patent application No. Hei. 2-39367 (filed Feb. 20, 1990) which is expressly incorporated herein by reference in its entirety.

DETAILED DESCRIPTION OF THE PREFERRED EMBODIMENT

Figure 2:
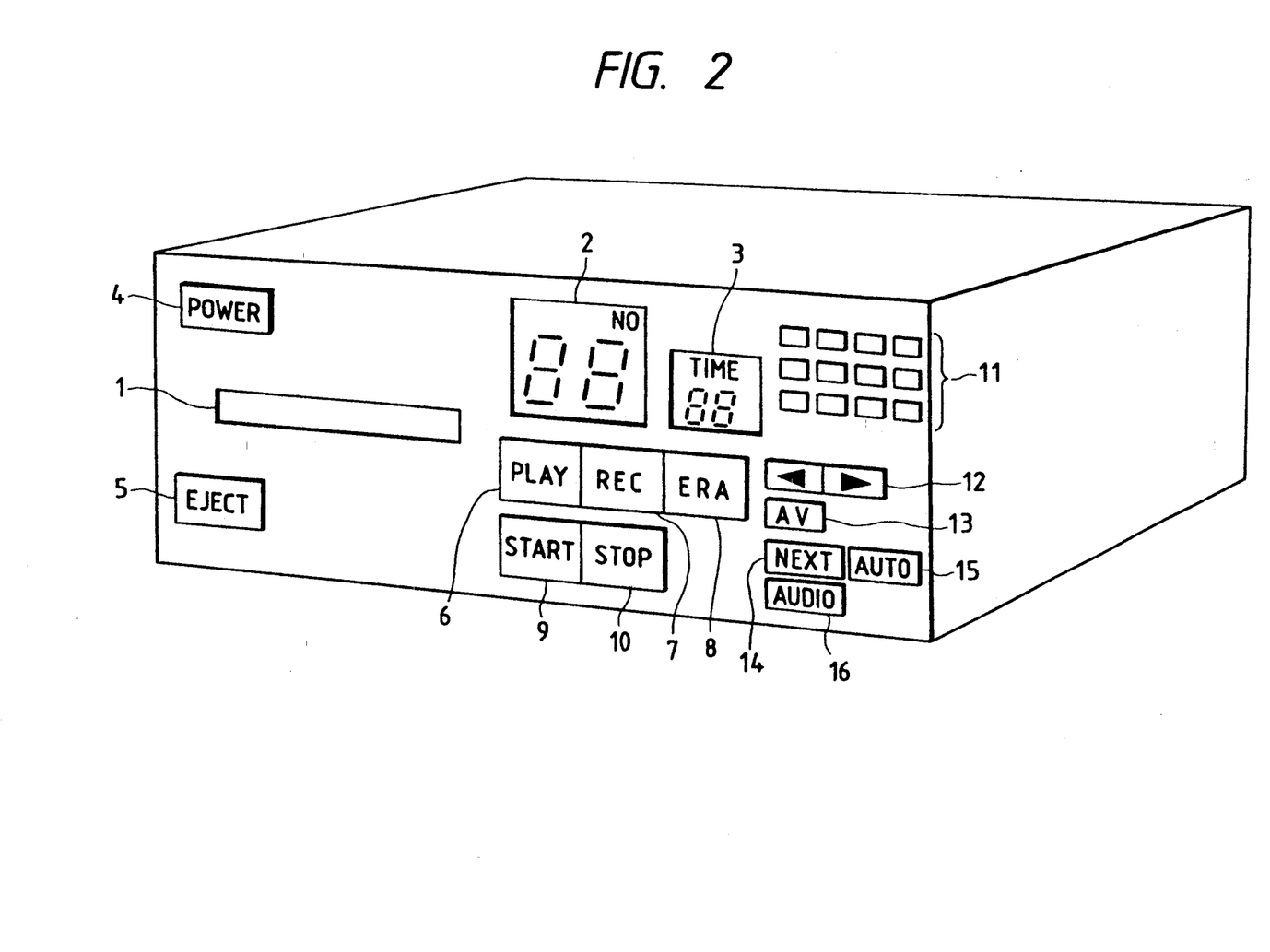
FIG. 2 is a perspective view showing the external appearance of the disk recording and reproducing device.

FIG. 2 is a perspective view showing the external appearance of one example of a disk reproducing device according to this invention, namely, a disk recording and reproducing device which can not only record signals on a magnetic disk but also reproduce signals therefrom.

An insertion opening 1 through which a magnetic disk is loaded in the device, display sections 2 and 3 for displaying a track number and time, various switches, etc. are provided on the front panel of the device.

A power switch 4 is operated to turn on or off the power source, and an eject switch 5 is operated to eject the magnetic disk from the device. A play switch (PLAY) 6, a record switch (REC) 7, and an erase switch (ERA) 8 are operated to set a reproducing (playback) mode, a recording mode, and an erasing mode, respectively. A start switch (START) 9 and a stop switch (STOP) 10 are operated to start and stop the operation in each of the operating modes.

A ten-key pad 11 is operated to input numerical data. A moving switch 12 is operated to access the track which is located one track radially inwardly or outwardly of the current track. An AV mode switch 13 is operated to set an AV mode. A NEXT switch 14 is operated to record video signals successively in the AV mode set by the operation of the AV mode switch 13. An auto switch (AUTO) 15 is operated to automatically access tracks one after another. A sound collecting (receiving) switch (AUDIO) 16 is operated to start the operation of collecting (receiving) audio signals, and to stop the operation thereof.

Figure 3:
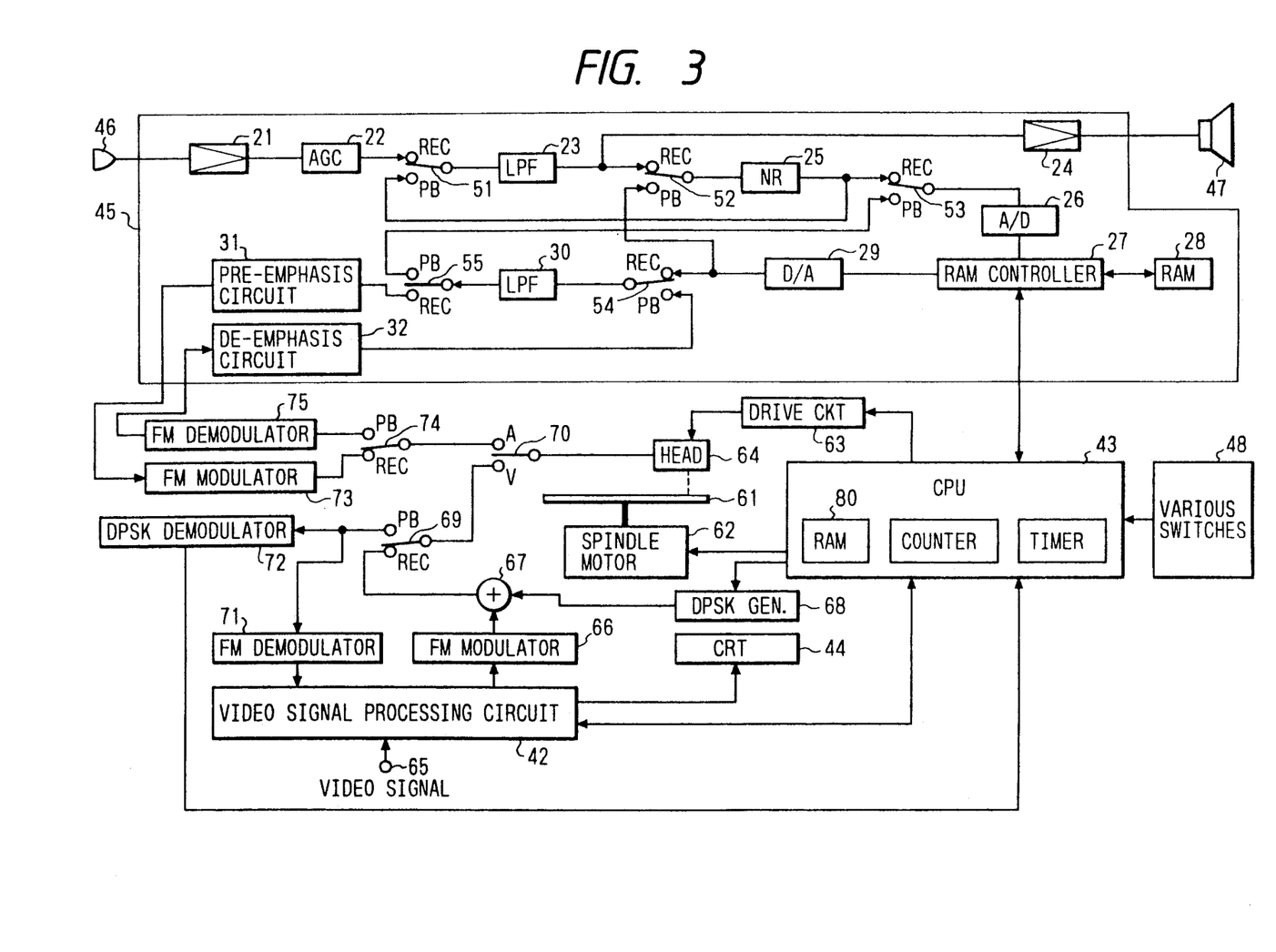
FIG. 3 in a block diagram showing the electrical arrangement of the disk recording and reproducing device.

FIG. 3 is a block diagram showing the arrangement of the disk recording and reproducing device of the invention.

A magnetic disk 61 is rotated by a spindle motor 62. A CPU 43 comprising a microcomputer drives the spindle motor 62. A drive circuit 63 drives a magnetic head 64 to move to a predetermined track. When various switches 48 which are provided on the front panel of the device shown in rig. 2, are operated, signals are applied to the CPU 43.

A video signal in applied to an external input terminal 65 by an image pickup circuit (not shown) including an image pickup device such an a CCD (charge-coupled device). The video signal is applied to a video signal processing circuit 42, where it is processed as required. The output signal of the video signal processing circuit 42 is applied to an FM modulator 66 where it is subjected to FM modulation. The output signal of the FM modulator 66 is applied to an adder 67, to which a DPSK (Differential Phase Shift Keying) signal provided by a DFSK signal generator 68 is supplied. In the adder 67, the two inputs are subjected to addition. The result of addition is supplied through change-over switches 69 and 70 to the magnetic head 64. In this case, movable contacts of the switches 69 and 70 are positioned to transfer the signal de described above in response to the actuation of the record switch 7.

The video signal outputted by the head 64 is applied through the switch 70 and the switch 69 to an FM demodulator 71 and a DPSK demodulator 72. The FM demodulator 71 and the DPSK demodulator 72 separate, extract and demodulate the signals in their own frequency components. The demodulated signals are applied through the video signal processing circuit 42 to a CPU 43 and a CRT 44, respectively.

An audio signal obtained through a microphone 46 is applied through another external input terminal to an audio signal processing circuit 45.

In the audio signal processing circuit 45, an audio signal from the microphone 46 is amplified by an amplifier 21. The signal is subjected to a signal processing following an automatic gain control (AGC) circuit 22, a switch 51, a low-pass filter (LPF) 231 a switch 52 and a noise reduction (NR) circuit 25. The output of the NR circuit 25 is applied through a switch 53 to an A/D (analog-to-digital) converter 26. After the A/D conversion, the digital audio signal is written through a RAM controller 27 to a RAM 28. In this case, the switches 51 and 52 are switched as shown in FIG. 3 in response to the operation of the REC switch 7. In addition, the CPU 43 operates to write a control code in a control code region of the RAM 28.

The audio signal which is once stored in the RAM 28 is read out to be applied through the RAM controller 27 to a D/A converter 29. In the DIA converter 29, the audio signal is converted to the analog audio signal. The analog audio signal is applied through a switch 54, a low-pass filter 30 and a switch 55, a preemphasis circuit 31 to an FM modulator 73. The FM modulated signal passes through a switch 74 and the switch 70 to the magnetic head 64 so that the audio signal and control code are recorded on the disk 61.

In the reproducing (playback) mode which is selected by the PLAY switch 6, the audio signal which is read out from the magnetic disk 61 is applied through the switches 70 and 74 to an FM demodulator 75 to be subjected to FM demodulation. The FM-demodulated audio signal is applied through a de-emphasis circuit 32, the switch 54, the low-pass filter 30, the switches 55 and 53 to the A/D converter 26. In the A/D converter 26, the analog audio signal is converted to a digital audio signal to be stored through the RAX 28 through the RM controller 27. Then the audio signal read out of the RAM 28 is subjected to signal processing in the D/A converter 29 and the NR circuit 25. After the amplification in an amplifier 24, the audio signal is reproduced by a loudspeaker 47.

In response to the input signals from the various switches 48, the CPU 43 operates to trip the movable contacts of the switches 69 and 74 over to the contact REC in the recording mode, and to the contact PLAY in the reproducing mode. Furthermore, the CFU 43 operates to trip the movable contact of the switch 70 to the contact A in recording or reproducing an audio signal, and to the contact V in recording or reproducing a video signal.

Figure 4:
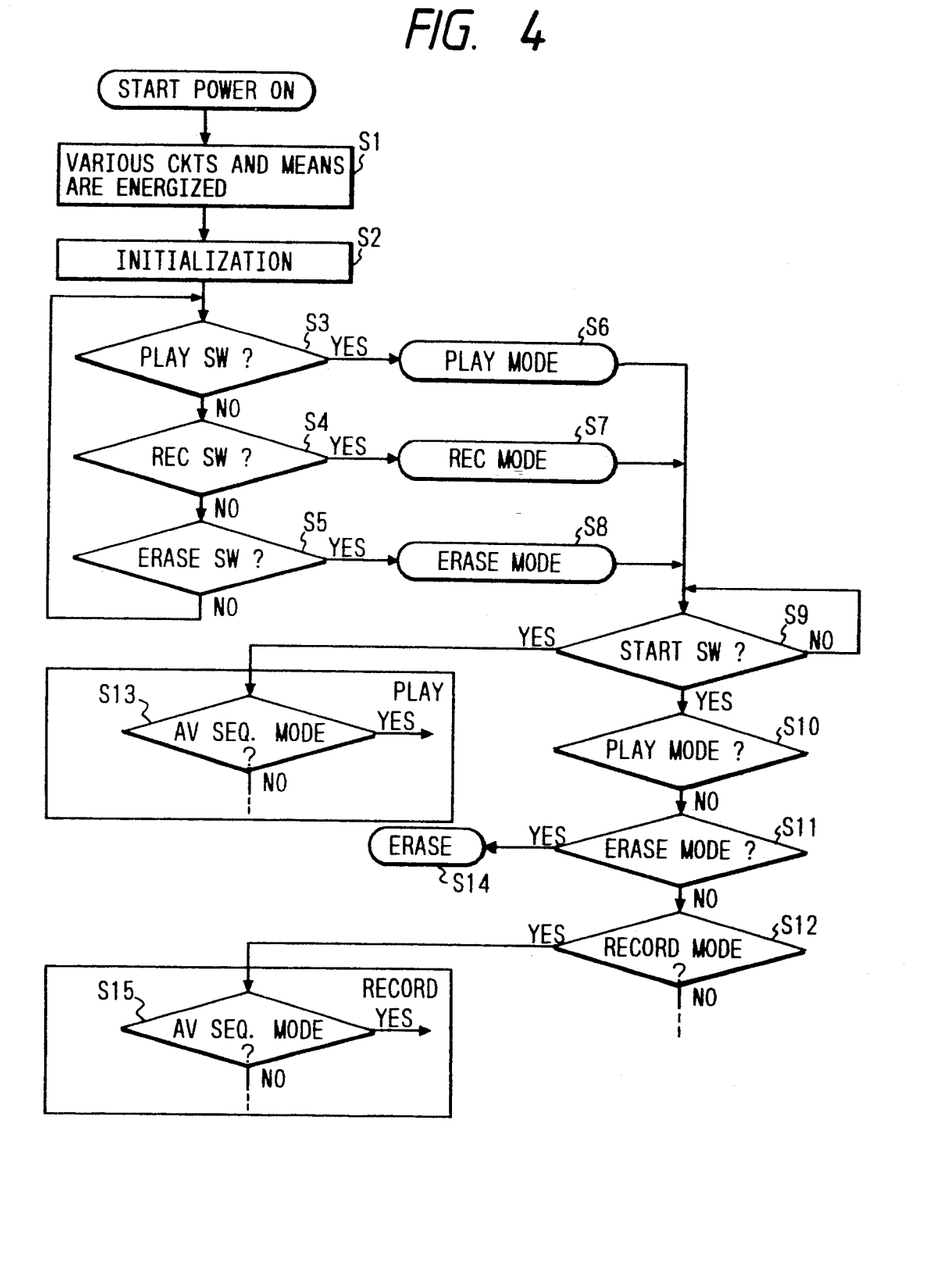
FIG. 4 is a flow chart for describing the fundamental operation of the disk recording and reproducing device.

In response to the operations of the switches 48, the CPU 43 carries out operations as shown in the flow chart of FIG. 4.

When the power switch 4 is turned on, the various circuits and means are energized, and initialized (Steps S1 and S2). Next, it is determined whether or not the play switch 6, a record switch 7 or the erase switch 8 has been operated and in response to such determination a playback (reproduce) mode, a record mode, or an erase mode is set (Steps S3 through S8).

Furthermore, it is determined whether or not the start switch 9 has been operated, and in response thereto, a reproducing operation, a recording operation or an erasing operation is carried out in correspondence to the set mode (Steps S9 through S15).

Figure 1:
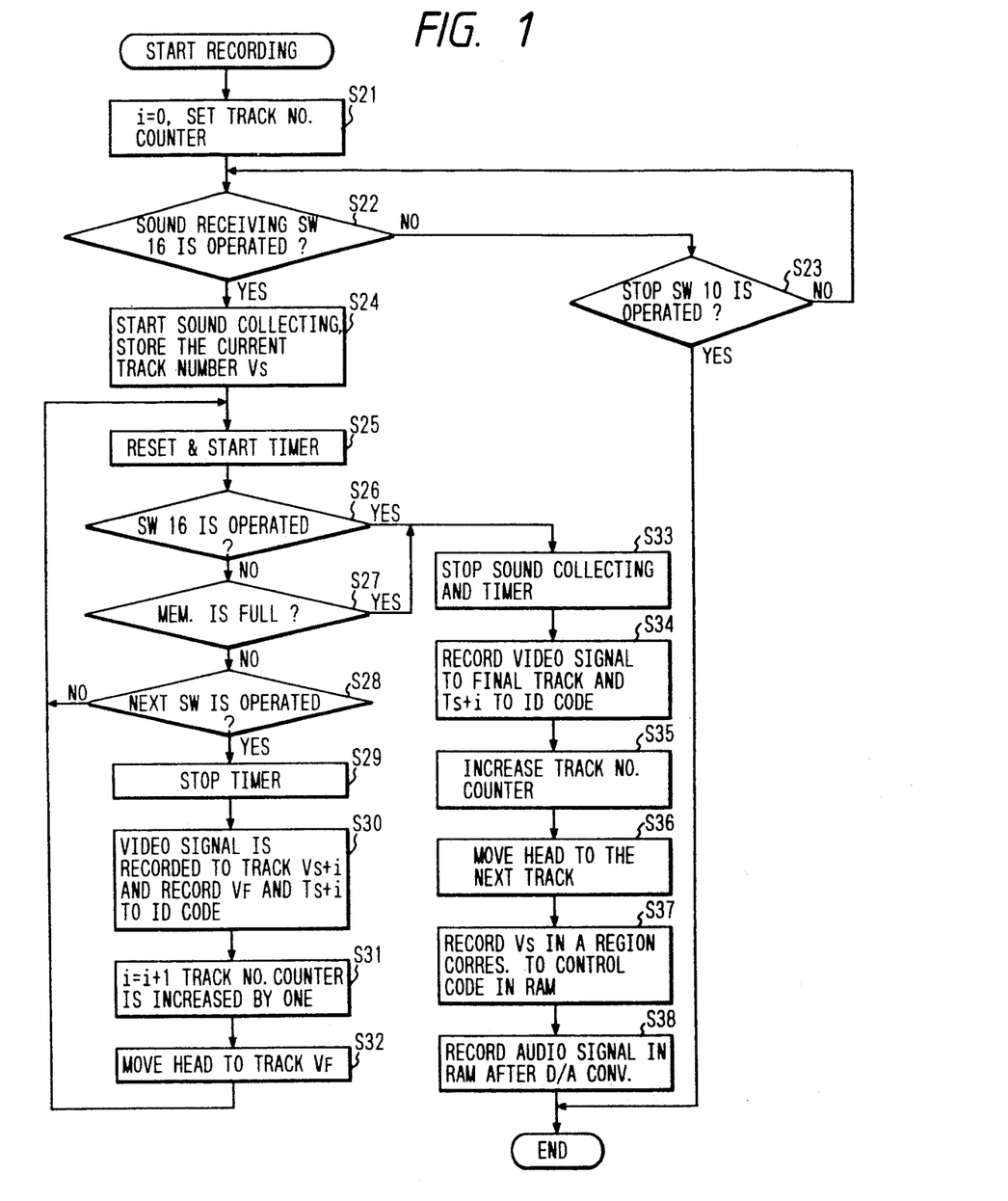
FIG. 1 is a flow chart for describing a recording operation of a disk recording and reproducing device according to this invention.

When, in the record mode, the switch 13 is operated to specify the AV mode, the CPU 43 performs operations as indicated in the flow chart of FIG. 1.

First a variable i of a counter of the CPU 43 is, set to "0" and a track number counter of the CPU 43 is also set to a desired value manually by the operator. It should be noted that the head 64 is also moved to the track corresponding to the desired value accordingly. The CPU 29 waits until the sound collecting (receiving) switch 16 is operated (Steps S21 through S23). If the stop switch 10 is operated before the sound receiving switch 16, the recording operation is stopped (Step S23).

When the sound collecting (receiving) switch 16 is turned on (Step S22), a sound collecting operation is started. Then, the current track number Vs on which the head 64 is positioned is recorded in the RAM 80 in the CPU 43 (Step S24), and a timer for the sound collecting operation starts after being reset (stop S25). At the same time, an audio signal which is received by the microphone 46 is applied to the audio signal processing circuit 45 where it is compressed logarithmically for noise reduction in the NR circuit 25, and emphasized. The audio signal thus processed is subjected to analog-to-digital (A/D) conversion in the A/D converter 26 and time-axis compression, and stored through the PM controller 27 in the RAM 28 serving as an audio memory.

This sound receiving operation is continued until either the stop switch 10 or the sound receiving switch 16 is operated or the audio memory becomes full (Steps S26 and S27) . During the sound collection operation, when the next switch 14 is operated (step S28), the counting operation of the timer in stopped (Step S29), and the video signal which is applied to the video terminal 65 when the NEXT switch 14 is depressed is recorded to the current video track $V_{s+i}$ (In this case, since i is set equal to 0 at an initial stage, the current track nutter is $V_a$). In addition to the video signal, the count value T and the next video track number $V_F$, ($=V_{s+i+1}$) corresponding to the audio signal being received, to which the video signal following the above recorded video signal is to be recorded, are recorded in a user's area of an ID code on the current video track $V_{s+i}$ (Step S30).

That is, a video signal inputted through the external input terminal 65 is applied to the video signal processing circuit 42, where it is subjected to necessary treatment such as, for instance, emphasizing. The output of the video signal processing circuit 36 is applied to the FM modulator 66y where it is FM-modulated.

The CPU 43 causes the DPSK signal generator 68 to produce the DPSK signal corresponding to an ID code including the count value T and the number (address) $V_F$ of the track located by one track radially inwardly (or outwardly) of the current track where the head 64 is positioned, in which the video signal corresponding to the audio signal being received is recorded next. In this case, the next track is located one track radially inwardly. The DFSK signal is applied to the adder 67, where it is superposed (multiplexed) to the output of the FX modulator 66. The output of the adder 67 is applied through the switches 69 and 70 to the head 64.

In this operation, under the control of the CPU 43 the spindle motor 62 is driven by the drive circuit 63, so that the disk 61 is rotated, for instance, at a speed of 3600 rpm (in the case of an NTSC system). As a result, the FM-modulated video signal of one field, for instance, and the DPSK signal containing the data on the next track number $V_F$ ($=V_{s+i+1}$) and the count value T representing an operation interval of the NEXT switch 14 are recorded on one predetermined track ($V_{s+i}$).

When the video signal has been recorded in the above-described manner, the variable i of a counter in the CPU 43 is increased by one (1) and the content of the counter in the CPU 43 is also increased by one (1), so that the head 64 is moved radially inwardly to the next track through the drive circuit 63 (Steps S31 and S32), and Step S25 is effected again.

The above-described operations are carried out repeatedly, so that the plural video signals corresponding to the audio signal being received are recorded on a plurality of tracks, respectively.

The above-described operations are performed :for any track. Setting i—0 does not mean that access is made to the first truck (whose track number in 0) of the disk.

When either the stop switch 10 or the sound receiving switch 16 is operated or the audio memory becomes full during the sound collecting operation, the sound receiving operation in stopped and the timer is stopped accordingly (Step S33). The last video signal and ID code including the count value T for the last video signal are recorded on the current video track (Step S34). Since this track is to record the last video signal, no number of the track where the next video signal is to be recorded is included in the ID code.

Subsequently, the count value of the counter for counting the track number is increased by one (1), and the head 64 is further moved one track radially inwardly (Step S36) and the first video track number $V_s$ which has been stored in the step S24 is written into a word code W3 of a control code in the RAM 28 together with the other control code (Stop S37).

Thereafter, the data which is stored in the RAM 28 according to such a pr determined audio signal recording format as proposed by the Electronic Industries Association of Japan is read out to be subjected to the following necessary signal processing in the circuit 45. The analog output of the circuit 45 is then subjected to the FM modulation in the FM modulator 73. The output signal of the FM modulator 73 is applied through the switches 74 and 70 to the head 64, so that it is recorded on the track which is located one track radially inwardly of the track where the corresponding last video signal has been recorded (Step S38).

Figure 5:
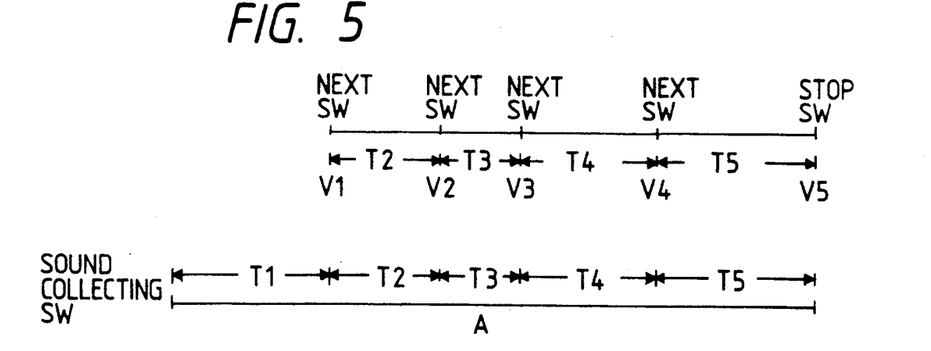
FIGS. 5 and 7 are timing charts for describing the signal recording and reproduction operations of the device.

FIG. 5 is a timing chart for the above-described recording operation. After the sound receiving switch 16 is turned on to start the sound receiving operation, the NEXT switch 14 in turned on voluntarily (according to the operator's judgement) with time intervals T1, T2, T3 and T4 and with the lapse of time T5 in this case the stop switch 10 is turned on. As a result, the video signals $V_1$ through $V_5$ are recorded on the first through fifth tracks which are located by one track radially inwardly in the stated order, respectively. In this operation, after the DPSK modulation an ID code including the reproducing time interval T1 and the number of the following second track are recorded on the first track; an TO code including the reproducing time interval T2 and the number of the third track are recorded on the second track; an ID code including the reproducing time interval T3 and the number of the fourth track are recorded on the third track; an ID code including the reproducing time interval T4 and the number of the fifth track is recorded on the fourth track; and an ID code including the reproducing time interval FS is recorded on the fifth track.

Figure 8:
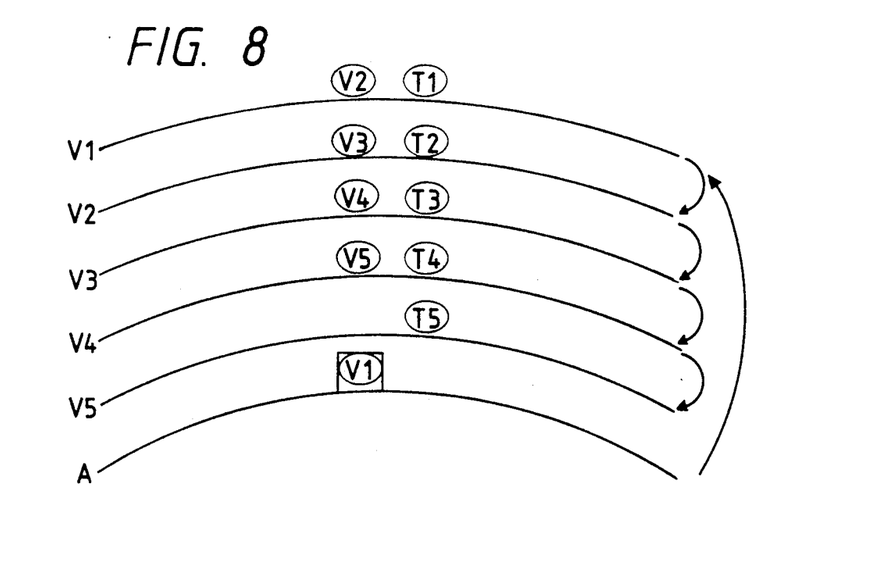
FIG. 8 is a diagram showing a track arrangement on a magnetic disk.

The audio signal A having the reproducing period of time corresponding to those video signals ($T_1+T_2+T_3+T_4+T_5$) is recorded through time-axis compression in the track which is radially inwardly next to the fifth track; i.e., the sixth track. The number Vs of the first track where the first video signal corresponding to the audio signal A is also recorded in an area for the control code in the sixth track. The above described track arrangement is shown in FIG. 8 in which arrows show an example of movement of the head 64 during the reproduction operation.

Figure 6:
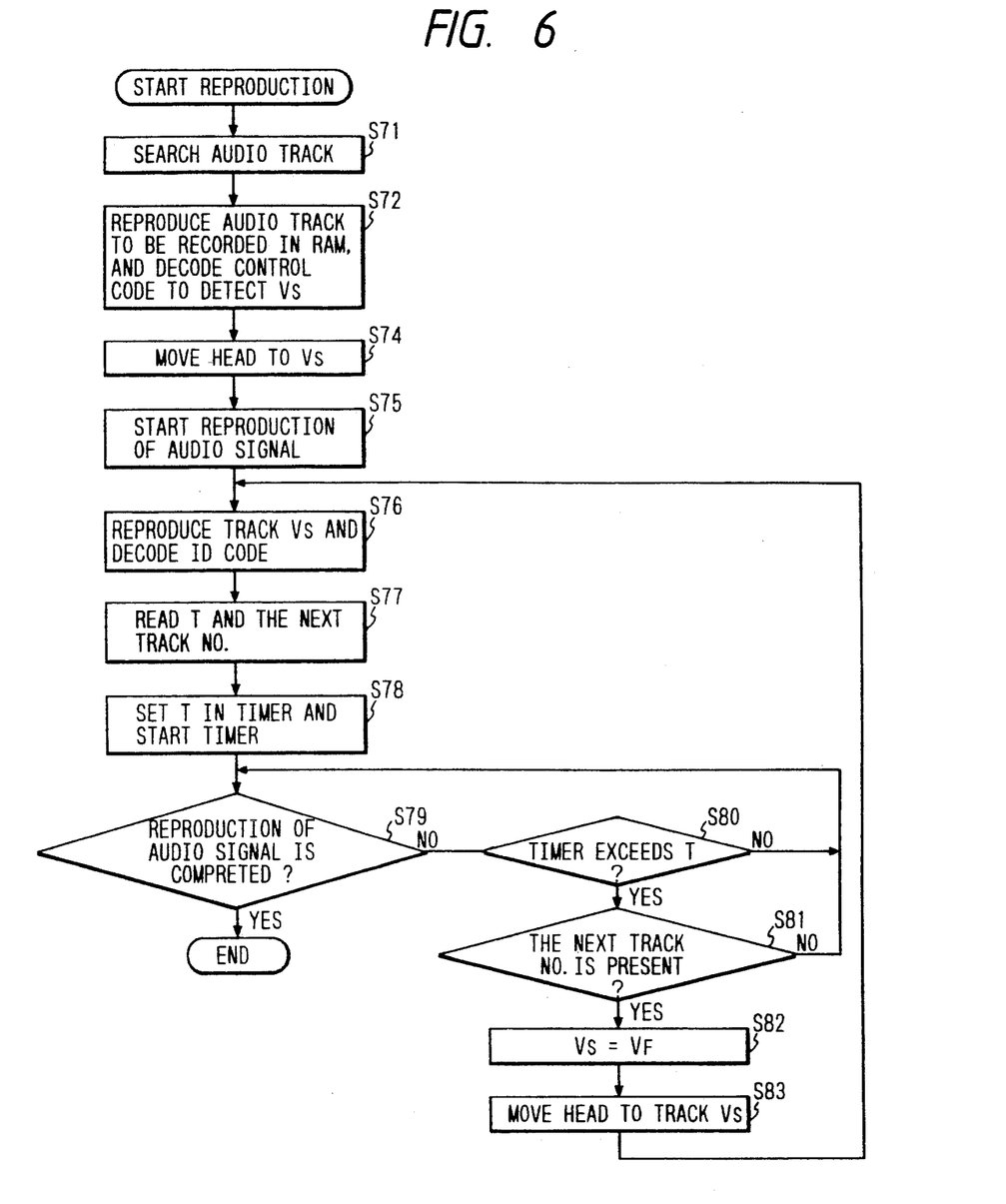
FIG. 6 is a flow chart for describing the signal reproducing operation of the device.

Next, the signal reproducing operation will be described with reference to the flow chart of FIG. 6. When the signal reproducing mode in set, an operation for searching an audio track is carried out so that the head 64 is moved to the track where the audio signal has been recorded (Step S71). Then, the audio signal is reproduced to be stored in the audio memory RAN 28. The control code (W3) which is contained in the audio signal is decoded to detect the first track number Vs where the first video signal corresponding to the audio signal recorded on the thus detected audio track has been stored (Step S72).

In response to the detection signal which is obtained in the step S72, the CPU 43 operates the drive circuit 63 to cause the head 64 to access the audio track. The reproduced audio signal is applied through the switches 70 and 74 to the FM demodulator 75. After the FM demodulation, the audio signal is subjected to signal processing in the de-emphasis circuit 32 and D/A converter 29. Then, the analog audio signal is applied through the RAM controller 27 to the RAM 28 serving as the audio memory to be stored therein.

When the writing of the audio signal into the audio memory RAM 28 has been completed, the head 64 is moved to the track Vs where the first of the video signals corresponding to the audio signal has been recorded (Step S74). The audio signal stored in the audio memory 28 is then read out through time axis expansion, and is subjected to digital-to-analog (D/A) conversion in which tune-axis expansion is carried out. Further, the signal is subjected to treatment such as logarithmic expansion for noise reduction, before being applied to the loudspeaker 41. At the same time when the reading of the audio signal from the RAM 28 starts, the first video signal is reproduced simultaneously, in addition, the ID code contained therein is decoded to obtain the data as to the following video track $V_f$ and the video signal reproduction time T. (Stop S75 and S76). That is, the CPU 43 causes the drive circuit 63 to move the head 64 to the first video track $V_s$ according to the data contained in the control code (W3) of the corresponding audio signal. The FM video signal reproduced by the head 64 in applied through the switches 70 and 69 to the FM demodulator 71 and the DPSK demodulator 72. The DPSK demodulator 72 extracts the DPSK signal from the input signal to be subjected to the demodulation. The demodulated signal is applied to the CPU 43 as an ID code through the video signal processing circuit 42. After the signal processing such as FM demodulation and de-emphasis in the circuit 42, the video signal is applied to the CRT 44 to be displayed visually.

When the video signal reproducing operation is started in this manner, the CPU 43 sets its built in timer to T according to the result of decoding the ID code and starts its decreasing operation (Steps S77 and S78).

In Stop 979, it is detected whether the audio signal reproduction has been completed. If no, the process advances to Step S80 where it is detected whether the count value exceeds the set value or not. When the count value exceeds the set value and the next track number $V_F$ is designated by the ID code of the DPSK signal, and then the CPU 43 causes the drive circuit 63 to move the head 64 to the next video track vp to reproduce the following video track (Steps 81 to 83). In this case, the head 64 is moved inwardly radially by one track to reproduce the next video track. Thereafter the process returns to the step B79. This operation continues until the corresponding audio signal has been completely reproduced.

Thus, the video signals recorded on the tracks are successively reproduced in such a manner that each video signal is reproduced for the actual video signal recording period of time T. That is, the video signals are reproduced successively with reproduction timing, an interval of which is equal to those determined in response to depression of a NEXT switch during the recording operation. The video signal reproducing operation is ended when the reproduction of the audio signal has been accomplished, because the number of the next video track number is not recorded in the ID code of the video track.

Figure 7:
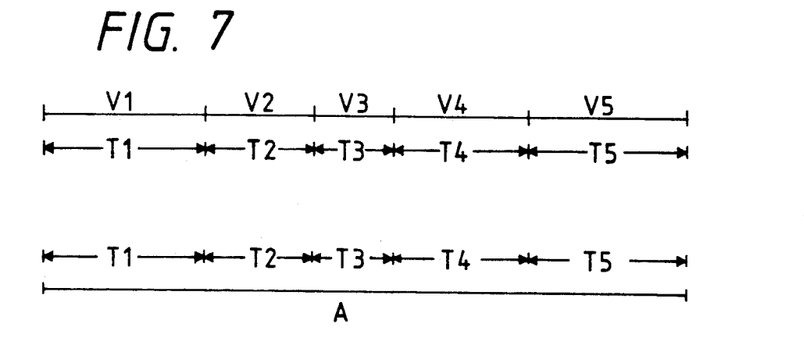

The above-described signal reproducing operation is as shown in a timing chart of FIG. 7. That is, when the signal reproducing operation starts, the first video signal $V_1$ through the last video signal $V_5$ are successively reproduced in correspondence to the time intervals $T_1$ through $T_5$ taken in the signal recording operation, while the corresponding audio signal A is continuously reproduced for the period of time ($T_1+T_2T_3+T_4+T_5$)

As is apparent from the above, according to the present invention, a plurality of video can be recorded and reproduced in combination with a single audio signal. Further, the video signals can be reproduced for desired different periods of time which are determined according to an interval of video trigger signals which are produced in recording each of the video signals.

What is claimed is:

1. A recording device having an audio/video mode in which a plurality of video signals corresponding to an audio signal are recorded on coaxial tracks on a recording disk, comprising:

a switching means which is operated during receiving the corresponding audio signal to initiate recording of each of the video signals on the disk;

a measuring means for measuring a video signal interval ending with each operation of said switching means;

a recording means for recording the video signals and the corresponding audio signal selectively to the coaxial tracks of the recording disk; and a control means for controlling said recording means so as to record the video signal when said switching means is operated, together with a next video track data representing presence or absence of a following video track wherein a next video signal corresponding to the audio signal is to be recorded and the measurement data of said measuring means, said control means controlling said recording means so as to record the audio signal together with a start video track data as to a start video track where a first of said plurality of video signals is to be recorded.

2. The device as defined in claim 1 wherein said recording means comprises an audio memory for storing the audio signal and the start video track data, and a signal processing means for processing the video signal, the measurement data of said measuring means and the next video track data according to a predetermined still video recording format.

3. The device as defined in claim 1 wherein the next video track data is data representing the track number of a next track following a current track, in which the next video signal is to be recorded.

4. The device as defined in claim 2 wherein the next video track data and the measurement data of said measuring means are recorded to a region corresponding to an ID code in a video track according to the predetermined still video recording format.

5. The device as defined in claim 1 wherein said control means operates to control said recording means to record a final video signal without the next video track data when the recording of the corresponding audio signal is completed.

6. A recording and reproducing device having an audio/video mode in which a plurality of video signals corresponding to an audio signal are recorded on coaxial tracks of a recording disk, and the recorded audio and video signals are reproduced in combination, comprising:

a switching means which is operated during receiving the corresponding audio signal to initiate recording of each of the video signals on the disk;

a measuring means for measuring a video signal interval with each operation of said switching means;

a recording and reproducing means for recording the video signals and the corresponding audio signal selectively to the coaxial tracks of the recording disk and for reproducing the recorded video and audio signals in combination; and a control means for controlling said recording and reproducing means so as to record the video signal when said switching means is operated, together with a next video track data representing presence or absence of a further video track where further video track where a further video signal corresponding to the audio signal is to be recorded and the measurement data of said measuring means, and said control means controlling said recording and reproducing means so as to record the audio signal together with a start video track data as to a start video track where a first of said plurality of video signals is to be recorded, the video signals being successively reproduced from the video signal recorded on a track designated by the start video track data according to the next video track data and the measurement data of said measuring means.

7. The device as defined in claim 6 wherein said recording and reproducing means comprises an audio memory for storing the audio signal and the start video track data, and a signal processing means for processing the video signal, the measurement data of said measuring means and the next video track data according to a predetermined still video recording format.

8. The device as defined in claim 6 wherein the next video track data is data representing the track number of a next track following a current track, in which the next video signal is to be recorded.

9. The device as defined in claim 6 wherein the next video track data and the measurement data of said measuring means are recorded a region corresponding to an ID code in the video track according to the predetermined still video recording format.

10. The device as defined in claim 6 wherein said control means operates to control said recording and reproducing means to record a final video signal without the next video track data when the recording of the corresponding audio signal is completed.

* * * * *